United States Patent
Geldman et al.

(10) Patent No.: US 6,332,182 B1
(45) Date of Patent: Dec. 18, 2001

(54) DISK DRIVE CONTROL WITHOUT IDENTIFICATION FIELDS

(75) Inventors: John S. Geldman, Los Gatos; Son H. Ho, San José; Petro Estakhrf, Pleasanton, all of CA (US); John J. Schadegg, Longmont, CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/425,535

(22) Filed: Oct. 22, 1999

Related U.S. Application Data

(60) Division of application No. 08/810,829, filed on Mar. 6, 1997, which is a continuation of application No. 08/478,354, filed on Jun. 7, 1995, now Pat. No. 5,740,358, which is a continuation of application No. 07/905,588, filed on Jun. 26, 1992, now abandoned, which is a continuation-in-part of application No. 07/904,804, filed on Jun. 25, 1992, now abandoned.

(51) Int. Cl.[7] .................................................. G06F 12/00
(52) U.S. Cl. .......................................... 711/156; 711/112
(58) Field of Search ................................. 360/48, 53, 51, 360/77.08, 78.04, 78.14; 711/111, 112, 171, 156

(56) References Cited

U.S. PATENT DOCUMENTS 4,179,736  12/1979  Wilhite .

(List continued on next page.)

OTHER PUBLICATIONS

Horowitz, Ellis and Sahni, Sartaj, Fundamentals of Data Structures, 1977, pp. 140–183, Computer Science Press, Inc., Potomac, Maryland.

Cirrus Logic, Enhanced PC XT/AT Disk Controller, Dec. 1990, pp. 1–84, Cirrus Logic, Inc., Fremont.

Cirrus Logic, Integrated Synchronous SCSI Disk Controller, Nov. 1989, pp. 1–116, Cirrus Logic, Inc.

"High–Performance PC XT/AT Disk Controller", Cirrus Logic Data Sheet, product #CL–SH360, Apr. 1992.*

*Primary Examiner*—B. James Peikari
(74) *Attorney, Agent, or Firm*—Blakely Sokoloff Taylor & Zafman

(57) ABSTRACT

An apparatus and method for disk sector layout, formatting, reading and writing, is based on a flexible formatter microengine that is driven by parameter lists, which may include commands to dynamically download the microengine's writable control store during disk access operations. This reduces the intervention required by the local microprocessor to support exception handling, including defect management, thus decreasing total access time for typical disk access (format, write or read) operations. This also reduces or eliminates the area on the disk required for ID fields, thus increasing the storage capacity of disk drives controlled by the present invention. This also increases disk space utilization, thus increasing the storage capacity of a disk drive controlled by using the present invention. Additionally, the invention is based on ID fields that may contain redundant information for increased fault tolerance. Additionally, the invention supports split data fields while minimizing the amount of additional information that the ID fields must contain about the data field split sizes. Alternatively, the invention supports eliminating ID fields entirely with the prior art functions of ID fields taken over by a combination of parameter lists and sector status flags.

8 Claims, 6 Drawing Sheets

U.S. PATENT DOCUMENTS

| | | |
|---|---|---|
| 4,642,775 | 2/1987 | Cline et al. . |
| 4,811,124 | 3/1989 | Dujari et al. ............................ 360/49 |
| 4,862,295 | 8/1989 | Tanaka et al. .......................... 360/48 |
| 4,931,888 | 6/1990 | Taguchi et al. ................... 360/77.04 |
| 4,999,720 | 3/1991 | Wilson et al. .......................... 360/48 |
| 5,142,680 | 8/1992 | Ottman et al. . |
| 5,210,660 | 5/1993 | Hetzler ................................... 360/51 |
| 5,247,633 * | 9/1993 | Nissimov et al. ....................... 711/4 |
| 5,255,136 | 10/1993 | Machado et al. ................. 360/77.02 |
| 5,274,772 | 12/1993 | Dunn et al. . |
| 5,278,703 | 1/1994 | Rub et al. ............................... 360/51 |
| 5,278,815 | 1/1994 | Mashimo et al. ...................... 369/48 |
| 5,285,327 | 2/1994 | Hetzler ................................... 360/48 |
| 5,305,302 | 4/1994 | Hardwick .......................... 369/275.3 |
| 5,319,544 | 6/1994 | Schmerer et al. . |
| 5,335,216 | 8/1994 | Suzuki et al. .......................... 369/59 |
| 5,515,212 | 5/1996 | Chiao et al. ...................... 360/77.03 |
| 5,517,631 | 5/1996 | Machado et al. . |
| 5,586,248 | 12/1996 | Alexander et al. . |
| 5,740,358 | 4/1998 | Geldman et al. . |

* cited by examiner

Sector Mark Generation Logic

SECTOR FLAG LOGIC

DISK DRIVE CONTROL WITHOUT IDENTIFICATION FIELDS

This application is a divisional of application Ser. No. 08/810,829, entitled "Defect Management in Disk Storage Systems Using Cyclic Redundancy Check Information with VFO Fields to Identify Sectors", by John s. Geldman, Son H. Ho, Petro Estakhri, and John J. Schadegg, filed Mar. 6, 1997, now abandoned, and assigned to Cirrus Logic, Inc. which is a continuation of application Ser. No. 08/478,354, entitled "Defect Management and Split Field Processing in Disk Storage Systems", by John s. Geldman, Son H. Ho, Petro Estakhri, and John J. Schadegg, filed Jun. 7, 1995, and assigned to Cirrus Logic, Inc. which issued into U.S. Pat. No. 5,740,358 on Apr. 14, 1998 which is a continuation of application Ser. No. 07/905,588, entitled "Flexible Disk Formats and Down Load Formatter Control Storage", by Petro Estakhri and John Schadegg, filed Jun. 26, 1992, now abandoned, and assigned to Cirrus Logic, Inc. which is a continuation-in-part of application Ser. No. 07/904,804, entitled "Dynamic Control of Disk Sectors", by Petro Estakhri and John Schadegg, filed Jun. 25, 1992, now abandoned, and assigned to Cirrus Logic, Inc. which is hereby incorporated by reference.

FIELD OF THE INVENTION

This invention relates generally to digital computer systems, particularly to mass storage subsystems. More particularly, the invention relates to layout of sectors within tracks of disk drives and to control of operations (such as format, write and read) that access such sectors.

BACKGROUND OF THE INVENTION

Computer systems often contain a storage device such as a disk drive. FIG. 1 shows a typical architecture of a disk subsystem A disk drive subsystem can be described as a system of disk platter(s); analog read channel and write channel circuitry; an encoder/decoder; a servo engine including a mechanical mechanism to position the read/write heads on the disk platter(s) and an electronic mechanism to control the head position; a local microprocessor (sometimes referred to as a local microcontroller); local processor memory; buffer memory; and disk drive controller circuitry. It is the task of the disk drive controller to interface with the host central processor or microcomputer and correctly read and write user data onto the disk.

Disk Organization

In a magnetic disk storage system, each disk platter is organized in tracks and sectors (also known as logical sectors). Each platter of a disk drive contains many concentric tracks. A track is an annular region of a given radius (actually, of a small but finite radial width) where data is stored. If both sides of a platter are used for storage or if the disk drive contains multiple platters, then multiple heads are required. A cylinder is the set of tracks that can be accessed by choosing among the heads without moving the heads to a new track position. Usually, it is necessary to transfer digital data onto the disk drive in sectors of a predetermined size. A sector is the smallest unit of user data that the host computer system can access (format, write or read) independently. A sector is a predetermined contiguous arc portion of a track having its own identification and the capability of magnetically storing a predetermined amount of digital data, for example, 512 bytes of user data.

In hard disk drives, tracks and sectors are often physically pre-defined at the time of manufacture of the disk by the placement of servo burst signals embedded within the recording area of each track. These servo bursts are used to define, measure and control the running positions (inward versus outward) of the read/write heads on the disk drive. One servo burst per track is uniquely identified as the index servo burst, and these indices align across tracks. Each sector normally has a first part that contains the sector identification or ID fields. The ID field for each sector is typically only written each time a disk is actually formatted. One task of the disk controller is to initialize or format the disks prior to storing any user data. Formatting defines the area of a disk to be set up as zones, tracks, and sectors. An alternative to the above-described embedded servo systems is a dedicated servo system in which one track per cylinder is dedicated to containing only servo information.

Many bytes in addition to the user data bytes are actually necessary within a sector in order to reliably address the sector on the disk and to provide for detection and correction of errors that may occur in the read/storage/write process due to phenomena such as defects in the platter media, electrical noise, and variations in the rotational speed of the platter(s). Another task of the controller is to add error correction codes (ECC) and cycle redundancy checking (CRC) to the user data in order to detect and possibly correct data that has been corrupted because of disk damage or some other problem. Additionally, the controller meshes the slow read and write times of the disk with the high speed transfers to and from the host computer. Additionally, the controller must monitor and accurately control the timing of reading and writing of data off of and onto the disk. This has been accomplished by means of a high speed format microengine, or formatter microengine, that executes microinstructions contained in a writable control store (WCS) contained in the controller.

The format microengine provides the data and the control required to perform the transfer of parallel digital user data into formatted, addressed, and error-protected channel data that can be serially placed on a disk. The data that is normally written into a sector contains the following: an ID (identification) field that acts like an address, a data field, an error correction field, gaps that are necessary to allow the read/write channel electronics to switch from reading to writing; and predetermined bit and byte patterns that are required to recover the exact bit frequency (which varies somewhat due to variations in the rotational speed of the platter), bit phase, and alignment of bit-stream data into bytes. The ID field and the data field each make up a concatenated set of bytes within a sector.

One common hard disk format that has been extensively used is to follow each servo burst with a gap, then a series of synch pulses to establish bit-time synchronization across read/write speed variations, then a mark byte to establish byte alignment within the bit stream, then a sector ID field that contains track number and sector number, then a gap, then a series of synch pulses to establish bit-time synchronization across read/write speed variations, then a mark byte to establish byte alignment within the bit stream, then a 512-byte data field, then a 7-byte ECC (Error Correction Code) field. In this format each sector is preceded by the servo burst. Servo bursts are written only at the time the disk is manufactured-portions are written slightly off the center of the track in order to allow the servo engine to keep the head centered on the track. Thus, during servo burst time, the access operations of reading, writing and formatting must be suspended.

One problem arising in modern disk drive system designs is lack of flexibility to accommodate the ever more complicated formats required to increase density, decrease latency, and improve reliability.

In the prior art, magnetic disk drive sector ID information is generally provided once as part of a substantially larger preamble to the sector data, with error tolerance being provided by CRC bits appended to the sector ID information for error detection purposes. While the CRC keeps misreading errors very low, the ID information for a particular sector will be lost in the event of hard errors in the ID field reading. In the case of optical drives where error rates are much higher, it is common to repeat the entire ID field, including bit-synchronizing and byte-aligning information, a number of times so as to allow repeated ID field reading attempts during a single pass to greatly increase the likelihood of at least one good read of an ID field for each sector. This technique has not been adapted in the case of magnetic disk drives however, because of the relative amount of storage capacity that would have to be dedicated to the entire and repetitive ID fields.

Defect Management

If a sector is, or over time becomes, defective (i.e. unable to accurately reproduce the data written thereon), there must be a way to map out to another physical sector the data that the logical sector would otherwise contain, or alternatively to simply skip over the sector (called slipping the sector), which results in a track that is shorter than expected. There is a need for a way to handle defective sectors automatically, i.e. with minimal intervention from the local microprocessor to handle the exception conditions that occur when access is attempted to a slipped or mapped sector. Additionally, there is a need to handle such occurrences efficiently, (i.e. with minimal impact on access times).

An important consideration in modern disk drive systems is the amount of time it requires for the read/write heads to locate and move to a new track position or (access time). This time includes the seek time and the rotational latency. Normally the magnitude of these times are dictated by the slowness of electromechanical devices. A method is needed to flag defective sectors and eliminate extraneous seeks which slow access time.

ID Fields

Storage space for a computer is very important. With the increasing amount of software and data processing size, the importance of disk drives being capable of handling greater amounts of data is paramount. The data written to the hard disk contains extra fields such as the ID field. The ID field contains information which can include the start of a sector, byte(s) to synchronize the reading of the ID field, the track or cylinder address, the read/write head number for a multi-headed system, the sector number, a flag field, and cycle redundancy check (CRC) information. In general, the ID field is similar to an address as to where the sector is located on the disk. The ID field layout may vary for different drive designs but remains consistent for each individual drive. How the ID field is written to the disk is controlled by a program in the writable control store. If this field can be reduced in size or located off the disk then other information could be stored in its place. This would effectively increase the data storage capability of the disk drive system.

Split Field Handling

A method of measuring the placement of the read/write head on the disk is necessary in order to maintain the servo mechanism of the read write head within a desired track. This has been provided by information such as servo bursts, marks, or patterns, on a separate platter or disk surface of the disk drive unit. Split field processing allows one to put control functions such as a servo burst in the middle of the data field which would eliminate the extra platter, thus reducing the cost of the drive while increasing the available storage. More than one servo burst per track is required in order to place adjacent tracks closer together, thereby increasing the number of tracks available on disk. Split field handling also allows one to utilize a short sector that has been partially damaged or is Just short because of the location on a drive. Information regarding the split field must be maintained or generated for each sector in the track in order to correctly retrieve the data that was split between the control signals. This data is usually encoded into the ID field of the sector and stored on the disk. An automated way of handling split data fields and storing the information other than on the hard disk is necessary to increase disk drive storage efficiency.

Zone Bit Recording/Banding

On a platter such as a disk storage device, the circumference of concentric circles becomes larger as the read/write head moves from the inner circle to the outermost circle. Similarly, the innermost tracks on a disk storage device that are closest to the center of the disk have a smaller circumferences than those of the outermost tracks. This creates smaller linear distances on the inside tracks. If the disk drive spins at the same rate of speed and the data recording rate remains constant, the density, measured in bits per inch, is greater on the inside track. This is an inefficient use of the outside tracks in the sense that the media in such tracks is capable of recording more information at a higher data rate to achieve the same linear bit density. To create a constant density recording one can increase the angular velocity of the disk as the read/write head moves to the outside tracks. Another means of approaching a constant density of bits stored on the disk is to increase the writing data rate as the read/write head moves out to the edge of the disk. In either method, tracks are usually grouped together in a zone or a band in order to maintain an area of constant disk speed or constant read and write frequencies. This technique is referred to as banding, zoning, or zone bit recording.

BRIEF SUMMARY OF THE INVENTION

An apparatus and method for disk sector layout, formatting, reading and writing, is based on a flexible formatter microengine that is driven by parameter lists, which may include commands to dynamically download the microengine's writable control store during disk access operations. This reduces the intervention required by the local micro-processor to support exception handling, including defect management, thus decreasing total access time for typical disk access (format, write or read) operations. This also reduces or eliminates the area on the disk required for ID fields, thus increasing the storage capacity of disk drives controlled by the present invention. This also increases disk space utilization, thus increasing the storage capacity of a disk drive con-trolled by using the present invention. Additionally, the invention is based on ID fields that may contain redundant information for increased fault tolerance. Additionally, the invention supports split data fields while minimizing the amount of additional information that the ID fields must contain about the data field split sizes. Alternatively, the invention supports eliminating ID fields entirely with the prior art functions of ID fields taken over by a combination of parameter lists and sector status flags.

It is an object of the invention to reduce the size of ID fields by minimizing the information concerning split data fields that is contained therein. A related object is to maintain a parameter list, one per zone or band, of first split sizes, which typically repeat after 4–7 sectors.

An alternative object of the invention is to eliminate ID fields entirely. A related object is to maintain sector status flags to indicate exceptional sectors, (such as defective sectors, sectors that are the normal end of the track, and sectors that are the end of a track that has been shortened by defective sectors).

An object of the present invention is to free the logical sector size from the fixed constraints of pre-defined sectors so as to allow logical sector sizes which are larger or smaller than the pre-defined sectors on a disk while at the same time making use of the full storage capacity of the disk. Related objects are to support data fields that are split across servo bursts, to support data fields that are segmented into multiple segments wherein each segment has an independently generated and verified ECC field, and to support data fields that are both split and segmented.

Another object to the present invention is to provide a simple, more error tolerant
ID information format for magnetic disk drives which does not substantially Increase storage capacity requirements therefor.

Another object of the invention is to speed up access time in reading and writing sectors that, due to media defects, have been slipped and mapped out of their expected location by eliminating the need for local microprocessor intervention and by eliminating extraneous seeks.

Another object of the invention is to eliminate the need for the servo processing engine to detect the start of each sector.

A further object is to respond to a disk fault signal generated from the servo processing engine.

An object of the present invention is to provide flexibility to respond to future requirements on disk sector format and reliability. A related object is to support real-time modification, or downloading, of the formatter microengine based on parameter-list entries.

Another object of the invention is to do the above in the context of zone bit, or banded. Recording, as well as in the context of a large range of sector sizes and maximum ECC coverage sizes.

DETAILED DESCRIPTION OF THE PREFERRED EMBODIMENT

Appendix A, filed in U.S. application Ser. No. 07/905,588 and entitled CL-SH4500 Wile E. Coyote Integrated SCSI Disk Controller Engineering Specification, is hereby incorporated by reference.

Error-Tolerant ID Fields

Figure 1:
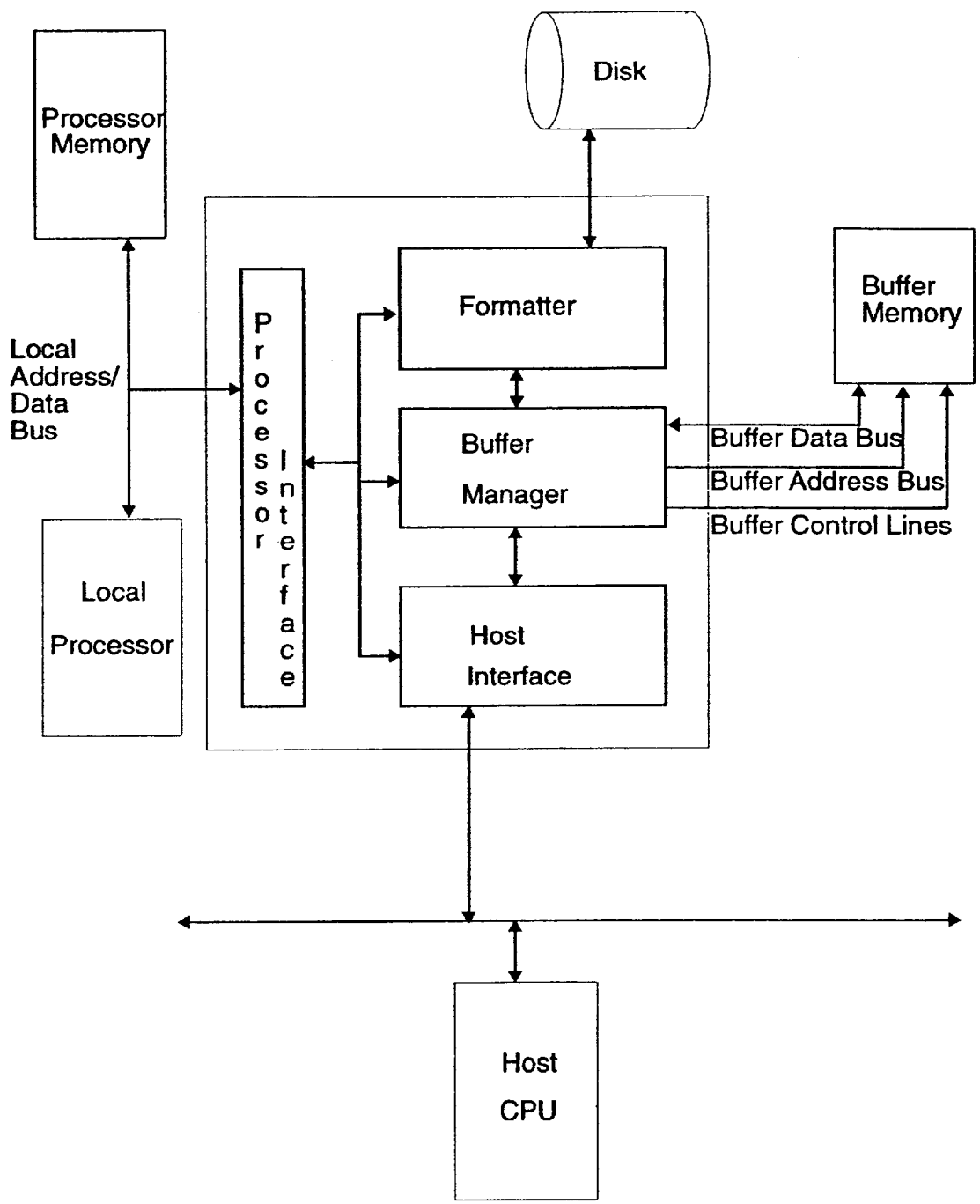
FIG. 1 shows a typical architecture of a disk subsystem.
Figure 2:
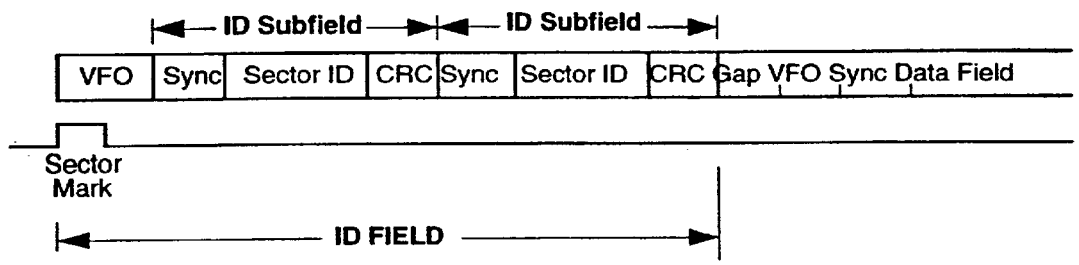
FIG. 2 shows the layout within a track of an error-tolerant ID field according to the present invention.

Referring to FIG. 2, a diagram illustrating an error tolerant ID (identification) field of the preamble of a sector of a magnetic disk storage device in accordance with the present invention may be seen. In addition to the protection provided by the usual CRC field, the ID field is made more error tolerant with the multiple ID subfield shown. In the Multiple ID subfield scheme, the ID field within each sector can have multiple subfields that all contain the same ID information, with each subfield having its own CRC field. During ID search, all ID subfields of a sector are read, and only one subfield needs to have a good CRC to determine the ID information of that sector. The ID information is lost only if all subfields have a bad CRC.

As may be seen in FIG. 2, in this scheme a sector preamble starts with the VFO (variable frequency oscillator) reference signal, followed by a number of ID subfields as determined at the time of disk formatting. Each subfield is in the form of sync signal followed by the sector ID followed by the CRC. While the multiple ID subfields increase the preamble overhead somewhat, substantial overhead is saved by not repeating the entire preamble, VFO and all, while at the same time the probability of not properly reading the ID field is greatly decreased by requiring that only one subfield need be properly read for successful sector identification purposes.

In the preferred method of practicing the invention, a multiple ID subfield count is maintained. This count is preset by the local processor with the number of the ID subfields of a sector, and can be decremented and refreshed during the ID search operation. With the use of this register, a simple program loop can be used to process through all the subfields of the sector and to be refreshed for the next sector preamble.

Data Field Splits and Segments

Figure 3:
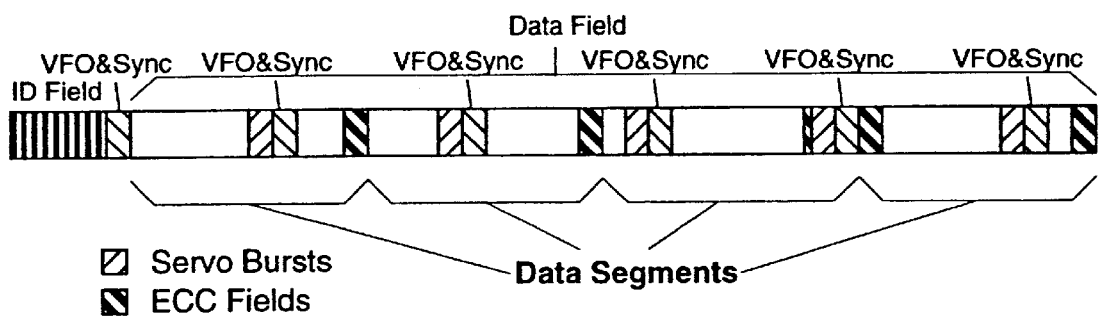
FIG. 3 shows the layout within a track of a split and segmented sector according to the present invention.

The present invention also provides for the automated processing of multiple data field sections within a given sector. In accordance with the invention, any sector can be: (1) segmented in a contiguous field with multiple redundancy fields, or (2) split into several non-contiguous fields which share a single redundancy field. The segmenting and splitting capabilities can be intermixed, with either the basic segment or the basic split being larger. Each capability provides unique benefits. FIG. 3 shows the layout within a track of a split and segmented sector according to the present invention.

The split field capability supports and simplifies embedded servo systems by utilizing all of the storage capacity between two servo pulses, and by not requiring this storage capacity to be an even multiple of the sector size. The segmented field capability supports sector sizes greater than the limit of the ECC code chosen. In the preferred embodiment, a Reed-Solomon ECC code is used having a maximum coverage of 1267 bytes. In any ECC encoding, increasing the amount of data covered by the same codeword decreases the protection against errors, but in the case of Reed-Solomon codes there is an abrupt limit beyond which the Reed-Solomon code simply will not function. Additionally, ECC segmentation makes it easier to implement multiple burst and/or "on-the-fly" error detection and correction.

There are two basic requirements for automated processing of splits. The first requirement is to support the synchronization of ECC computation or generation across non-contiguous data fields. The second requirement is to support the automated retrieval of the physical configuration of the split on the media. In one embodiment, this information can be both stored on and extracted from the media (typically in the ID field). In another embodiment, this information can be both stored in and retrieved from a buffer memory or the processor memory.

The basic requirement for the automated processing of segments is simply to keep a count of the bytes being written and automatically process a redundancy field at the appropriate byte limits. Split sector layouts with servo bursts embedded in the data field can be automatically handled by: (1) the proper combination of start and stop operations to control the timing of the generation, processing, reading and writing of the ECC information, and (2) embedding some split size information in the ID field, or in a parameter list in the buffer or the processor memory. This maximizes data capacity, and zone recording techniques are easier to employ as any track or band of tracks can have an optimized track format with varying data field split sizes for each sector within the band.

Split Data Field ECC Processing: When the split data field error detection and correction processing function is active, the beginning boundary of a data field that is to be split into at least two fields is detected. The freezing and restarting of an EDAC-generation operation (error detection and correction) during a write to disk is preferably done automatically between the split data fields. Likewise, the freezing and restarting of an ECC verification operation during a read from disk is preferably done automatically between the split data fields.

Split Data Field Size Processing: Preferably the second major function for supporting split data fields is the capability of automatically retrieving or calculating the split sizes to relieve any local processor both from tracking the physical splits and from constant reprogramming of the split data field size in the format sequencer program.

The present invention maintains several counts to automatically retrieve split data field size information. These include: a 16-bit SECTOR DATA REMAINING COUNT; a 12-bit FIRST SPLIT COUNT; a 12-bit MAXIMUM SPLIT COUNT; a 12-bit SPLIT FIELD COUNT. Also employed is a control signal, "Enable Split Field Count And Sector Data Remaining Counter. A sector can have multiple splits. In the preferred embodiment, 3 potentially different split sizes within a sector are provided for: the first split, the last split, and the ones in between. In the format driven mode, the first split size is retrieved from the ID format. Alternatively, in the parameter-list or the down-load modes, the first split size is stored and retrieved locally. The sizes of the splits in between the first and the last ones are the same and are equal to the MAXIMUM SPLIT COUNT. The last split size can be derived from the SECTOR DATA REMAINING COUNT.

Sector Data Remaining Count

Figure 4:
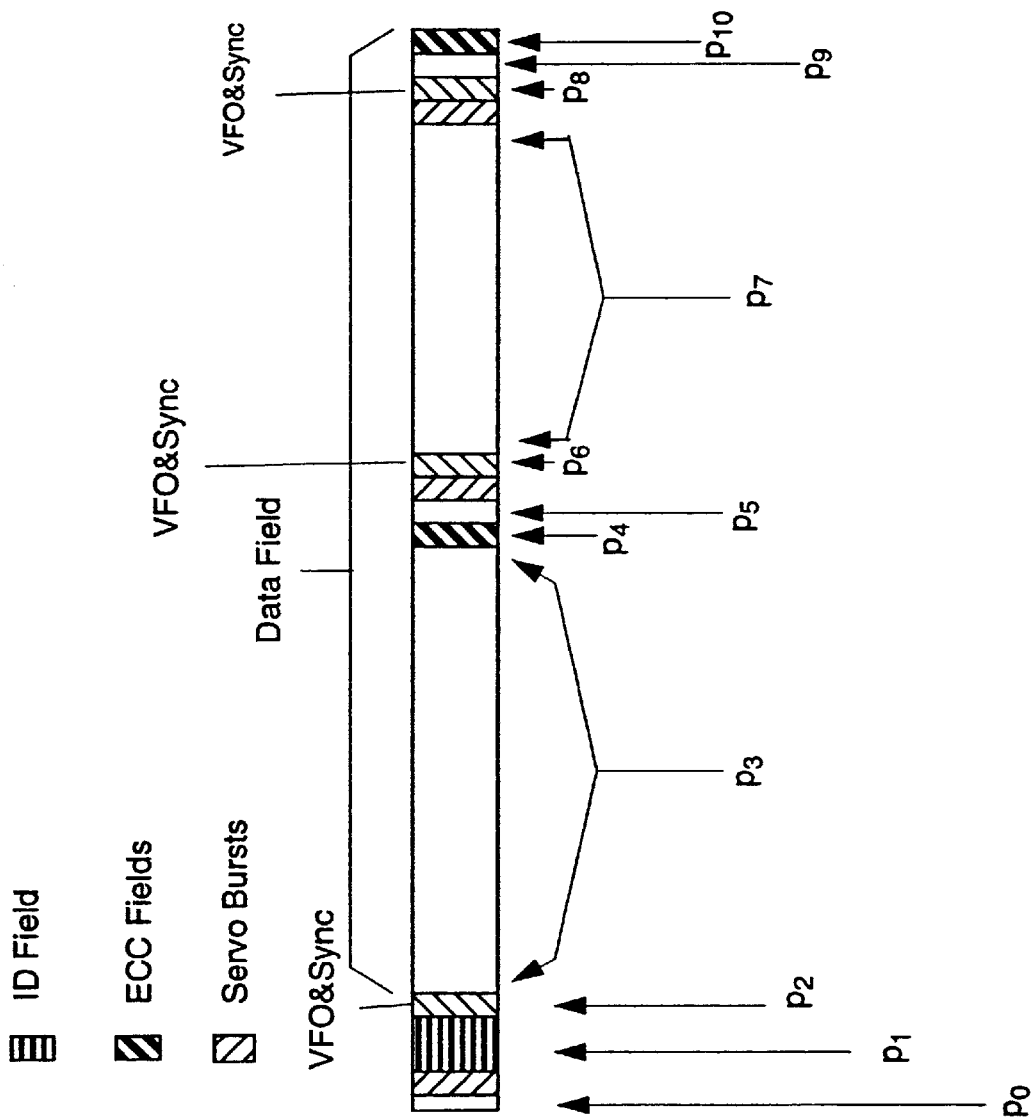
FIG. 4 shows a track of a split and segmented sector within a zone with the operation of various counters shown according to the present invention.

The SECTOR DATA REMAINING COUNT is used to track the number of bytes remaining in the current logical sector (which may or may not consist of multiple split data fields or multiple ECC segments). This count is decremented once during every byte time that the Enable Split Field Count and Sector Data Remaining Count signal is active. This count needs to be initialized only once by the local processor, which sets it equal to the logical sector byte count. It is refreshed without local processor intervention for each sector. Referring to FIG. 4, the initialization occurs just prior to period $p_3$ and the SECTOR DATA REMAINING COUNT is decremented during $p_3$, $p_5$, $p_7$ and $p_9$.

First Split Count

This count can be (1) set by the local processor, (2) downloaded from buffer or processor memory, or (3) embedded in the ID field and retrieved while reading the ID field (e.g. during $p_1$ in FIG. 4). In format mode (which is the only tine that the ID field is written), this count is set with the value to be written in the ID field on the disk. In either case (whether set locally or retrieved from the ID field), the FIRST SPLIT COUNT will be used by the SPLIT FIELD COUNT to process the very first split of the data field.

Maximum Split Count

This count is set by the local microprocessor with the number of information (sync, data and ECC) bytes in the splits between the first and the last splits, and is used as the initial value for the SPLIT FIELD COUNT for the splits after the first one. At the end of the last split of the data field (e.g., at the end of p9 in FIG. 4), the SECTOR DATA REMAINING COUNT will reach zero and thus end the data field processing. The MAXIMUM SPLIT COUNT needs to be initialized on power up and re-initialized whenever the read/write heads are moved to a track with a different data frequency, (i.e. a different zone).

Split Field Count

This count is used in processing split data fields. The SPLIT FIELD COUNT is used when the Enable Split Field Count And Sector Data Remaining Count control signal is active. The first time this count is enabled on a sector (e.g. just prior to $p_3$, in FIG. 4), the FIRST SPLIT COUNT is used to initialize the SPLIT FIELD COUNT. The counter is decremented once for each information byte (i.e. sync, data or ECC) transferred across the disk interface. Referring to FIG. 4, it is decremented during p3,–p4, p5, p7, p8, p9, and p10. When it reaches zero, the end of the first data split has been reached and it indicates the start of the servo mark (which must not be overwritten). On the second and all subsequent splits the MAXIMUM SPLIT COUNT is used as its initial count. Note that the SPLIT FIELD COUNT will begin counting down from its initial count (either the FIRST SPLIT COUNT or the MAXIMUM SPLIT COUNT) after the data sync bytes. It will not stop on ECC field, specifically to support the ECC segmentation capability.

Enable Split Field Count And Sector Data Remaining

The Enable Split Field Count and Sector Data Remaining Control bit (of the Current Sequencer Word Control Field) is used to replace the normal Current Sequencer Count Field feature with the SPLIT FIELD COUNTER and the SECTOR DATA REMAINING COUNTER. When this control bit is set and the Split Field Mode Disable bit is reset, a branch command is evaluated when either the SPLIT FIELD COUNTER or the SECTOR DATA REMAINING COUNTER is used and a branch command is evaluated when this counter reaches zero.

ECC Segmentation Capability

The ECC segmentation capability allows the present invention to support physical sector sizes larger than a code-word size supported by an ECC code. For example, the 88-bit Reed-Solomon code used in the preferred embodiment has a hard limit of 1278 bytes (including ECC bytes) per code word. When active, an 11-bit data coverage count is provided which is decremented once for every byte.

In this segmentation mode, the data field is divided into contiguous segments, each of which will have its own ECC field. (The format sequencer will be able to transfer each data segment and process its ECC one after another.) The DATA COVERAGE LIMIT counter needs to be initialized upon system power up or re-initialization by the local processor to the maximum segment byte count. The SECTOR DATA REMAINING COUNTER is still used to track the number of the bytes remaining in the logical sector. When the DATA COVERAGE LIMIT counter reaches zero (e.g. at the end of p3 in FIG. 4), the sequencer will automatically process the ECC bytes. After processing the ECC bytes, if the SECTOR DATA REMAINING COUNTER (which is held constant and not decremented during ECC transfer) is not zero, then the format sequencer will begin processing another segment within the same data field. On the last segment of a particular data field (e.g. at the end of p9 in FIG. 4), if the SECTOR DATA REMAINING COUNTER reaches zero before the DATA COVERAGE LIMIT COUNTER, then the last ECC field will be processed when the SECTOR DATA REMAINING COUNTER is zero. Therefore the last segment could be shorter than the preceding ones and thus the sector size does not have to be an even multiple of the segment size. However, the segment size is preferably kept as close as possible to a constant so that the "on-the-fly" correction circuitry is provided with sufficient time to find and apply correction results.

Mixing Splits and Segments

As is shown in FIG. 3, the ECC segmentation capability is designed to also work with split data field processing. Prior to the start of processing of the ECC field, the ECC TRANSFER COUNT is initialized to the number of bytes of ECC information required per segment, which is a predetermined value (i.e. 11 bytes) in the preferred embodiment. During processing of the ECC field, the ECC TRANSFER COUNT decrements. Also, the SPLIT FIELD COUNTER still decrements and thus will keep track of the bytes remaining in the current area between servo bursts. When the Sequencer returns from the split processing WCS code to the data and ECC processing code, then the status of the counters (namely DATA COVERAGE LIMIT, SECTOR DATA REMAINING, and ECC TRANSFER) will continue the appropriate activity even in the case where it is the ECC field that is broken up by the servo burst. That is, if at the end of a servo burst the ECC TRANSFER register is non-zero, then the remaining bytes of the ECC information are read or written prior to resuming the reading or writing of the user data. In the case where the ECC segmentation is not required (e.g, because the sector size is within the ECC code limit), then both the DATA COVERAGE LIMIT COUNTER and the SECTOR DATA REMAINING COUNTER must be programmed with the sector size. The ECC field process will still be done automatically after the user data field.

The operation of these aspects of the invention can be summarized in reference to FIG. 4. During the user data periods p3, p7 and p9 the SPLIT FIELD COUNT, the SECTOR DATA REMAINING COUNT, and the DATA COVERAGE LIMIT COUNT are each decremented once per byte read or written. During the ECC-information periods $p_4$ and $p_{10}$ the SPLIT FIELD COUNT and the ECC TRANSFER COUNT are each decremented once per byte read or written.

Figure 5:
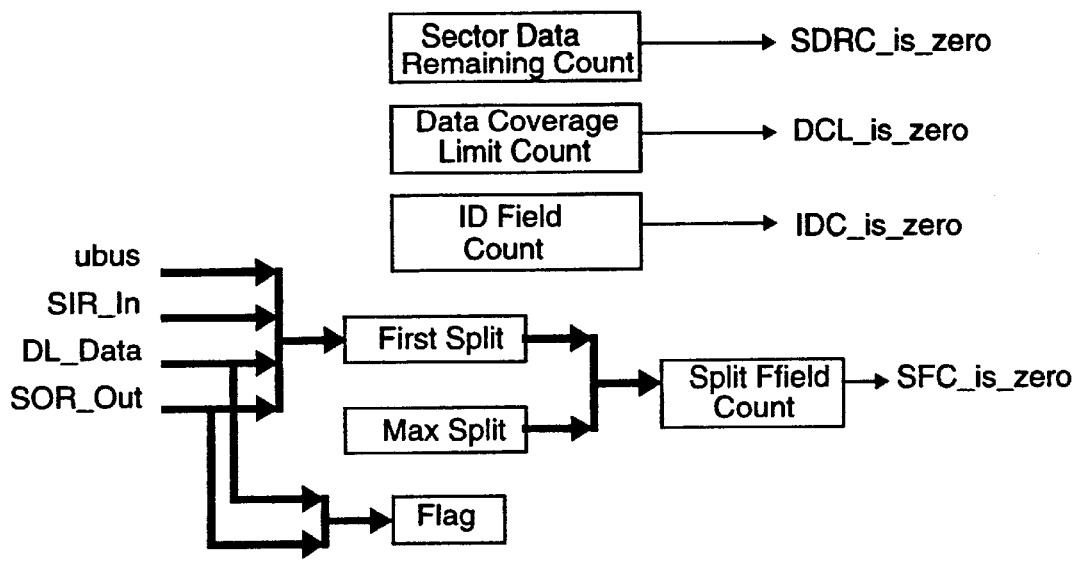
FIG. 5 shows a simplified register-level block diagram of the Inter-Field Logic Module which generates control signals used in determining the layout and timing of split and segmented data fields.

The implementation of these aspects of the present invention is illustrated in FIG. 5. FIRST SPLIT COUNT and MAXIMUM SPLIT COUNT are registers. SECTOR DATA REMAINING COUNT, DATA COVERAGE LIMIT COUNT, and ID FIELD COUNT are combination register/counters that count down from their initial value, generate a control signal when they reach zero, and then reset themselves to their initial value. Their initial value is established by the local microprocessor.

Format Driven Capabilities

In the present invention, the Secondary Compare circuit can be used to retrieve format information from the ID field. This information can be used in split field processing, automated sector search retries, automated multi sector accesses, and defect management processing.

Load FIRST SPLIT COUNT Secondary Compare Flag: The Load FIRST SPLIT COUNT Secondary Compare Flag is a defined bit in the Fixed Secondary Compare Flags which can be used to trigger the retrieval of 12-bits of count information from the ID field. This value can be programmed as the length of the first split of the data field. The most significant nibble is contained in the same NRZ data byte. The remaining byte must be the following NRZ data byte.

End of Track Secondary Compare Flag: The End of Track Secondary Compare Flag is a defined bit in the Fixed Secondary Compare Flags which can be used to trigger the Format Sequencer multi-sector branch conditions. Typically it is used to mark the end of a track, such that the Format Sequencer can make real-time decisions on when to abort a multi-sector read.

Short Track Secondary Compare Flag : The Short Track Secondary Compare Flag is a defined bit in the Fixed Secondary Compare Flags which can be used to trigger the Format Sequencer multi-sector branch conditions. It is designed to be used in place of the End of Track Secondary Flag in a disk format that uses sector Skipping as a Defect Management technique. In this technique, the number of sectors per track may vary as the media ages. This Flag can also trigger an interrupt to the local processor.

Parameter List and WCS Down Load Capability

In the present invention, parameter lists, which may preferably be located in the Buffer Memory, can be used to automate several tasks. These include: (1) timing of an internally generated sector mark from externally generated servo bursts, or from the end of the previous sector mark, wherein a parameter-list entry specifies the required information on the delay from the triggering event to the time when the next sector mark is to be generated by the present invention; (2) increasing the storage capacity of the disk by removing from the ID field the length of the first split of the data fields (wherein a parameter-list entry specifies the required information on the size of the first split); (3) loading sector status flags, including the End of Track flag (indicating the last sector in a track before the index servo burst), the Short Track flag (indicating the last sector in a track that contains fewer sectors than expected because of defective sectors in the track) and the Defective Sector flag (indicating that the current sector is defective or relocated); and (4) general-purpose dynamic updating of the Format Sequencer's (or format microengine's) Writable Control Store (WCS). The parameter list capability is under the control of the Local Processor in that it (1) enables the download/parameter list function, (2) selects what events trigger download/parameter list processing, and (3) initializes the parameter lists in the buffer memory (perhaps using disk-format-design information contained in the ROM portion of its system memory, perhaps using potentially dynamic information obtained from the disk itself.

This parameter list capability assists(1)in handling exception conditions such as defective sectors, tracks shortened by slipped (or skipped over) defective sectors, and mapped (or relocated) sectors; and (2) in creating a disk format without the traditional ID field. For example, a sector mapped to another cylinder may be handled by a download of modifications to the WCS program or bitmap instead of by an interrupt to the local microprocessor (which would often incur a full rotational latency due to the local microprocessor interrupt service latency, and interrupt processing time).

Figure 6:
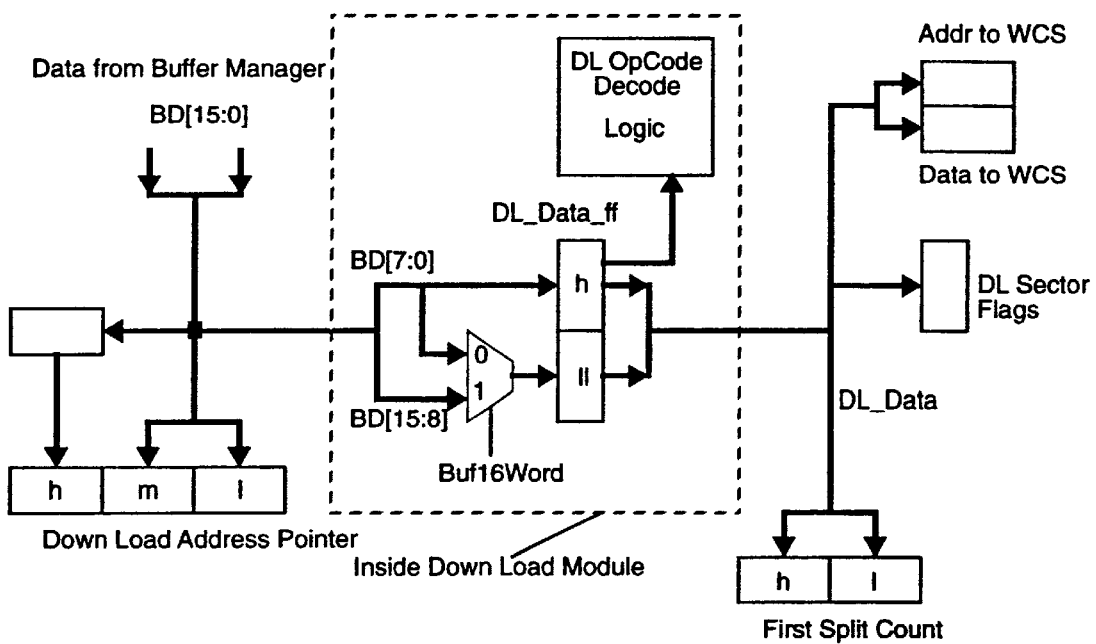
FIG. 6 shows the data path diagram of the Down Load Module.

The Down Load Module consists of three components: the Down Load Address Pointer; encoded Down Load (or parameter) Lists; and Sector Mark Generation Logic. The data path of the Down Load Module is shown in FIG. 6. The Down Load Address Pointer points to the encoded word to be downloaded. Before the Down Load Circuit is started the Down Load Address Pointer is set, preferably by the local processor to the start of the appropriate Down Load List. In the case where the down load circuit is set to activate on Index (whereby a download or parameter list is evaluated or processed upon the next detection of an index servo burst), then the Down Load List pointed to will be the first Down Load List. After each download cycle the Down Load Address Pointer is incremented to the next word in the list and the download continues until the end of the list, which is recognized by the End List Flag. At the end of each Down Load List, the Down Load Address Pointer is not always automatically altered. Rather the final operation of any Down Load list either may leave the Down Load Address Pointer pointing to the next Down Load List that happens to be contiguous in Buffer Memory or it may load the Down Load Address Pointer from the current (and final) instruction of the current Down Load List, thus updating the pointer to the start of the next Down Load List that happens to be non-contiguous within the Buffer Memory. This, in affect, creates an efficient but flexible linked-list data structure for the Down Load Lists. Thus, a Down Load List is not fixed in length and its location in Buffer Memory can be linked to the previous list.

This linked-list aspect of the Down Load List is particularly valuable in those situations (which are common in practical disk drive designs) in which there is a repeating pattern, called a frame, in the first split sizes. That is, the first sector within a track will have a first split size of X, the second sector will have a first split size of Y, and so on until the N'th sector has a first split size of X—after which the pattern or frame repeats. Thus in the present invention, Buffer Memory space is only required for N–1 Down Load Lists, with the first N–2 entries ending with the Down Load Address Pointer pointing at the next contiguous Down Load List and the N–1'st entry ending with an operation (code 1tH) to reset the Down Load Address Pointer to the start of the first Down Load List.

A Down Load List is read from the buffer and its instructions executed every time the Down Load Circuit is triggered. Depending on the status of enable flags, the Down Load Circuit may be triggered either (1) by the next servo burst, (2) by the next sector pulse (internally or externally generated), or (3) by the next index pulse.

The encoding of Down Load List operations or instructions is described in the following table:

TABLE 1

Down Load List Encoding

| 1st Byte | 2nd Operand | Description |
| --- | --- | --- |
| 0xH | yyH | 0xh is the End-of-the Down-Load-List flag, xH contains End of Track, Short Track and Defective Sector Flags. |
| 1tH | uuH vvH wwH | 1tH is the Linked End-of-the-Down-Load-List Flag, the contains End of Track, Short Track, and Defective Sector Flags, and uuvvwwH |

TABLE 1-continued

Down Load List Encoding

| 1st Byte | 2nd Operand | Description |
| --- | --- | --- |
| | | being the twenty-four-bit pointer to the next Down Load List. |
| 2xH | yyH | xyyH is the twelve-bit count for Internal Sector Mark generation. |
| 3xH | yyH | xyyH is the twelve-bit value to be stuffed into FIRST SPLIT COUNT Register. |
| [4–5]xH | yyH | [4x–5x]H are reserved flags (currently NOP's) |
| [6–F]xH | yyH | yyH is the eight-bit value to be loaded into WCS address [6x–Fx]H. |

Figure 8:
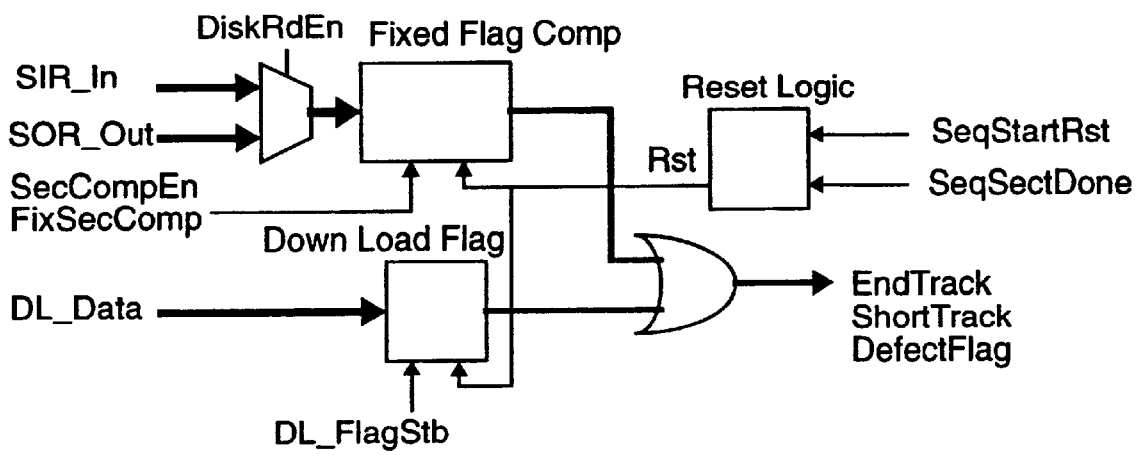
FIG. 8 shows the Sector Flag Logic.
Figure 9:
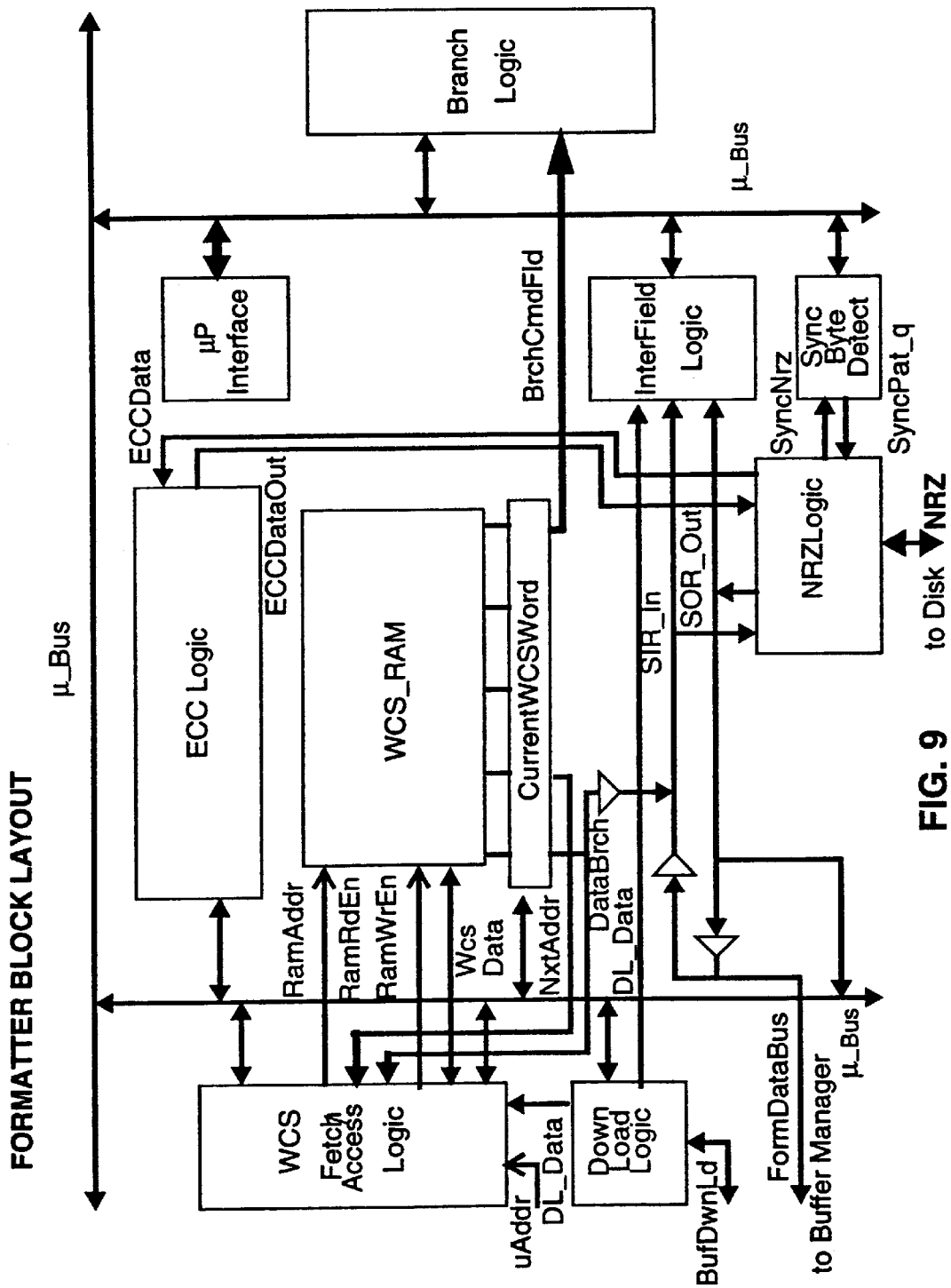
FIG. 9 shows the overall architecture of the formatter.

Generating Sector Flags: The second nibble in either the End-of-the-Down-Load-List or the Linked End-of-the-Down-Load-List bytes contains End of Track, Short Track and Defective Sector Flags. These flags bits are only used when the Down Load List is triggered by either the (internally or externally generated) SECTOR MARK signal or the INDEX signal. FIG. 8 shows the Sector Flag Logic that generates the control signals corresponding to three flags from either the sector tag field in the ID field read from the sector, or from the Down Load Logic.

Generating an Internal Sector Mark

Figure 7:
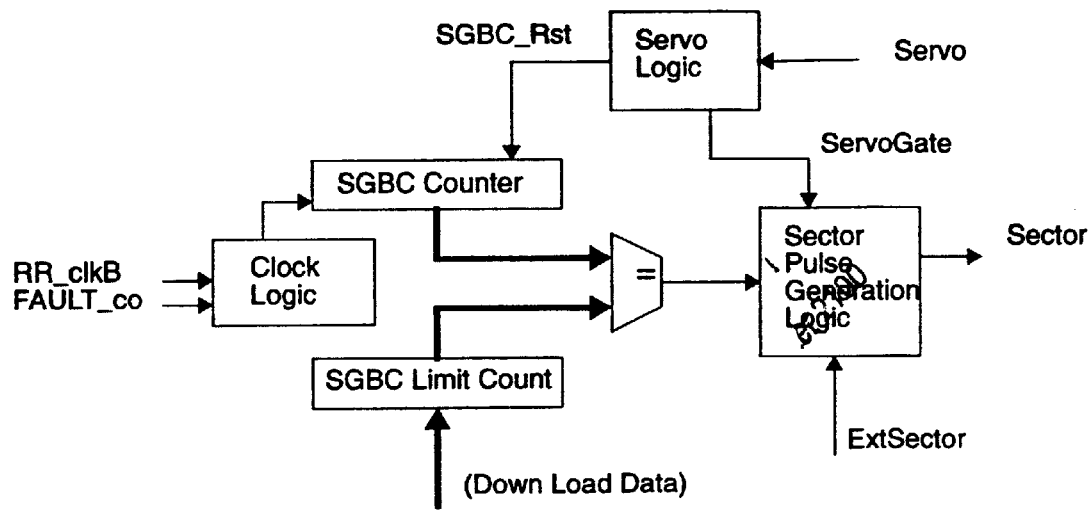
FIG. 7 shows the Sector Mark Generation Logic.

In the present invention, the Sector Mark Generation Logic consists of a Sector Mark Counter (SMC) and a Sector Generation Byte Counter (SGBC). The SMC keeps track of the number of sector pulses relative to Index. It monitors the Index signal, the servo burst signal and the output from the SGBC. The SGBC is a up-counter which is incremented once every byte time. The Read Reference Clock (RR_CLK) is used to derive the clock to run the SGBC. Note that derivation of a byte clock from RR_CLK is trivial when the NRZ path is one-bit, two-bits, four-bits, or eight-bits wide. The Sector Mark Generation Logic is shown in FIG. 7.

The SGBC, which consists of a counter and a limit register, restarts from zero every time the Down Load Module is triggered by the servo burst. The SGBC counter output is compared against the SGBC limit register. When they are equal, an internal SECTOR MARK is generated and the SGBC counter is restarted at zero. However, even though the SGBC counter is running, another SECTOR MARK will not be generated unless the SGBC limit register is updated. The SGBC limit register can be loaded by the local processor, but is usually loaded by a buffer down value (using Down Load instruction operation code 2xH).

The SECTOR MARK is produced at the time that the SGBC counter is equal to the SGBC limit register. However, if the SERVO signal is active at this time, then the internal SECTOR MARK will be delayed until the SERVO signal is de-asserted. This is useful for generating an internal SECTOR MARK immediately after a SERVO signal burst. This can be forced by loading a value of zero in the SGBC limit register. When the SERVO signal burst is received, the SGBC counter is reset to zero, and a match occurs. The SGBC circuit will then wait until the SERVO signal is de-asserted to generate the internal SECTOR MARK. This special case can be thought of as an overlapping between the internal SECTOR MARK and the external SERVO signal burst. The Down Load Module will not be triggered by the (overlapped) SECTOR MARK, even if the Enable Down Load By Sector Mark control bit is set. This technique is also used when starting the Sector Mark Generation logic before INDEX, where an internal SECTOR MARK should be generated immediately after the servo burst. In this case the SGBC limit register is loaded by the local processor with a value of zero before the logic is started.

In a Dedicated Servo system, the sector pulse is expected to come from the external servo circuit and it is directly used by the SMC. In this mode the SGBC is turned off and all 2xyyH code is ignored. This mode is selected by setting the Sector Mark/Servo Burst mode bit for Sector Mark Mode.

Other Uses of Down Load

Loading the FIRST SPLIT COUNT using Down Load

The 3xyyH code word is used to download the FIRST SPLIT COUNT for split data field support. The nibble x in the byte 3xH is the most significant nibble of the COUNT. The remaining byte is the remainder of the twelve-bit value. Since a Down Load is started by either a Servo Burst or an (internal) Sector Mark, the Down Load List Structure should be maintained in such a way that the FIRST SPLIT COUNT is only downloaded once for each sector (therefore it should be downloaded by Sector Mark triggers).

Updating the WCS Using Down Load

This is a general purpose tool which provides partial or complete Format Sequencer "Overlays" for the Writable Control Store. The code words of 6xyyH-FxyyH are used to download the WCS byte at address 6xH–FxH. Consideration must be made about the relative timing between the download start time (usually at Sector Mark) to the time the Sequencer would use the updated WCS bytes. Usually the Down Load Module is used at the beginning of a sector (at the SECTOR MARK) to update the WCS bytes which are executed at the end of the ID field, the end of the data field, or at the beginning the of the sector (the WCS instruction word which branches on the occurrence of a SECTOR MARK). The Trigger Buffer Down Load bit in the FORMAT SEQUENCER BRANCH INSTRUCTION FIELD when set will trigger a download cycle and this bit is typically used for controlled updating of the WCS.

Using Down Load to Pre configure Track Access: In some intelligent disk drive systems, a defect table is consulted to build the expected configuration of the track, allowing for both the defect management schemes of skipping sectors and alternate sectors. This is typically done during an armature seek or concurrently with another track access. This expected configuration can be built in the form of a Track Down Load Table. The Down Load List for each sector can update the WCS instruction which is evaluated at the Sector Mark signal to branch to a WCS code routine. Thus different WCS code routines can be setup to handle skipped, redirected, or good sectors differently, where the Down Loaded WCS bytes will select which routine is to be used for that sector. The updated WCS instruction is downloaded one sector ahead however, since there is a natural latency for the Buffer Manager to retrieve the Down Load bytes, and for the Down Load Module to update the WCS. For slipped sectors, the Down Load List can change the branch instruction to decrement the SECTOR MARK COUNTER and continue to search for the next SECTOR MARK. This allows the SECTOR MARK COUNTER to match the logical number of the track, instead of limiting the SECTOR MARK COUNTER to the physical ordering. For alternate sectors, the Down Load List can change the branch instruction to jump to a special code routine. In this code routine, disk streaming can be disabled (from a branch instruction), and this instruction should also activate data transfer using the SECTOR REMAINING COUNTER. Note that both READ GATE and WRITE GATE should NOT be asserted. This will have the effect of incrementing the DISK ADDRESS POINTER by a sector size, while limiting the SCSI access to the data of the previous sector, and continuing in real time to access the rest of the track with correct buffer ordering.

Down Load can help support disk drives with dedicated servo systems by internally generating the SECTOR MARK pulses. The servo system is often a fixed frequency, and there is processing to be done by digital signal processing (DSP) support circuitry in the servo system or servo engine to generate the SECTOR MARK from the fixed servo frequency. The fact that the processing to be done may need to be different for various zoned densities complicates the servo system's job of generating sector marks. If SERVO pulses can be passed to the present invention, then it can use these and its Down Load Module to generate appropriately timed SECTOR MARK pulses.

ID-Less Disk Sectors

The above-described parameter lists and Down Load Lists form the basis of a disk format or layout that has no ID-fields.

In a first ID-less embodiment of the present invention, Down Load Lists containing the required sector status flags and first split sizes may be retained in Buffer Memory. This requires substantial space in Buffer Memory, or wherever they are retained, because even though the first split sizes typically repeat in patterns or frames, the sector status flags are often related to management of media defects which can be random. Thus in this embodiment, an individual Down Load List is required for each sector. Accordingly, the Buffer Memory must be large enough to contain numerous Down Load Lists, and the Local Processor must initially load the Buffer Memory (or whatever other memory the parameter lists may be stored in) with such Down Load Lists from a non-user-data area of the disk. Also, if any sectors are newly determined to be defective, both the on-disk copy and the in-buffer-memory copy of the affected Down Load Lists must be updated.

In a second, alternative ID-less embodiment of the present invention where Buffer Memory space is limited, a subset of the sectors of the disk forms the current "working set" of sectors (based on a criteria such as most recently used) and the local processor "pages" the Down Load list of each sector into Buffer Memory, much like a virtual memory manager pages user data into and out of main memory from disk storage. Alternatively, paging could be done per track, i.e. the Down Load Lists of all sectors within a particular track could be paged into Buffer Memory at the same time.

Sector-Flag Sectors

In a third ID-less embodiment, Sector-Flag Sectors can be located in a non-user-data area of the disk. They could be located for example in a sector numbered minus one (−1) immediately after the index servo burst on each track, or alternatively on such a sector on only a subset (e.g. the first) of the tracks within each cylinder. A Sector-Flag Sector contains only non-user data, such as split counts and sector status flags. Sector-Flag Sectors may be encoded as Down Load Lists as described herein or may be encoded in a less flexible but more compact fixed-field representation. An example of the later representation is a format wherein each sector has a predetermined number, say 2, of bytes of information with, say, the first 4-bit nibble of the first byte representing sector status flags and the remaining 12-bits representing a first split count if a good sector, or the address of the sector to which this sector has been mapped if a bad sector.

It will be obvious to one skilled in the art that there are a range of other ID-less embodiments that are variations on the concepts herein disclosed. For example: a fourth ID-less embodiment may use the DownLoad List mechanism to contain repetitive information such as first split counts and the Sector-Flag Sector mechanism to contain information that is unique per sector such as sector status flags and potentially repetitive information such as first split sizes. A fifth ID-less embodiment may add a paging scheme to the fourth embodiment.

Dynamic or Algorithmic Sector Formats

The parent of this application discloses techniques for handling split data fields in which the first split size information is not needed to be kept either in a parameter list or in the ID field but rather is dynamically calculated. It will be clear to one skilled in the art how this technique can be utilized in conjunction with the present invention, including but not limited to combining the split field technique of the parent application with the multiple ID, the ID-less, the parameter list, the WCS down load, or the ECC code-word segmenting techniques of the present invention.

While the preferred embodiment and various alternate embodiments of the present invention has been disclosed and described herein, it will be obvious to those skilled in the art that various changes in form and detail may be made therein without departing from the spirit and scope of the invention.

We claim:

1. A disk drive controller for controlling the reading and writing of data to a magnetic disk without using ID fields within sectors of the magnetic disk, the disk drive controller comprising:

a processor for controlling the reading and writing of data to the magnetic disk;

a memory for holding in memory information pertaining to the control of the reading and writing of data to the magnetic disk;

a memory controller coupled to the memory and the processor, the memory controller for controlling writing and reading of memory information in the memory; and a formatter controller coupled to the memory controller and the processor, the formatter controller for electrically coupling to the magnetic disk to read and write data thereto and the control thereof, the formatter controller including, a linked list of a plurality of parameter lists for storage in the memory, each parameter list corresponding to each sector of the magnetic disk, each parameter list including sector status flags for a track indicating the last sector in the track before an index servo burst on the magnetic disk, a last sector in the track that contains fewer sectors than expected because of defective sectors in the track and a current sector in the track is defective or relocated, and each parameter list including a first split count indicating the size of the first split of a data field in a sector to process the data field in the sector without an ID field stored within the sector indicating its location on the magnetic disk in order to read and write data between the magnetic disk and the disk drive controller.

2. The disk drive controller of claim 1, wherein the formatter controller further includes:

an address pointer for pointing to the beginning of each of the plurality of parameter lists; and a sector mark generator for generation of a sector mark signal responsive to a servo burst on the magnetic disk or a delay from an end of a prior sector mark equal to a predetermined sector mark delay stored in each parameter list for a track.

3. The disk drive controller of claim 2, wherein a copy of the plurality of parameter lists is also stored in a non-user-data area of the magnetic disk.

4. The disk drive controller of claim 1, wherein the plurality of parameter lists are stored in the memory.

5. The disk drive controller of claim 1, wherein a subset of sectors of the magnetic disk forms a current working set of sectors and a subset of the plurality of parameter lists associated with the subset of sectors of the magnetic disk are stored in the memory.

6. The disk drive controller of claim 5, wherein the subset of sectors is a plurality of the most recently used sectors.

7. The disk drive controller of claims 1, wherein each track on the magnetic disk has at least one sector and a parameter list associated with the at least one sector within a track is stored in the memory.

8. The disk drive controller of claim 1, wherein sector-flag sectors are located in a non-user data area of the magnetic disk and are an encoded form of the parameter list.

* * * * *